3,407,203
NOVEL PROCESS FOR THE PREPARATION OF
DIKETOPIPERAZINES
Raoul Buijle, Brussels, Belgium, assignor to Union
Carbide Corporation, a corporation of New York
No Drawing. Filed Mar. 22, 1965, Ser. No. 441,840
14 Claims. (Cl. 260—268)

ABSTRACT OF THE DISCLOSURE

Diketopiperazines are prepared by contacting an N-carboxy anhydride with an amidoxime.

This invention relates to a novel process for the preparation of heterocyclic nitrogen containing compounds. In one aspect, this invention relates to a novel process for the synthesis of diketopiperazines. In another aspect, this invention relates to a novel process for the synthesis of diketopiperazines in relatively high yields. In a further aspect, this invention is directed to the preparation of novel intermediate reaction products obtained in the synthesis of diketopiperazines.

The conventional synthesis for the preparation of diketopiperazines, hereinafter also referred to as alpha-amino acid anhydrides, involves the condensation of two moles of the amino acid in accordance with the equation:

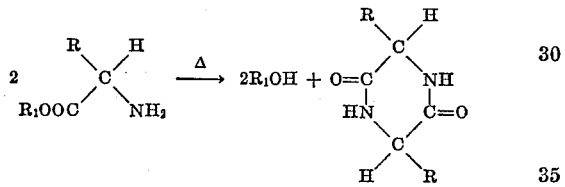

However, this process generally requires heating the alpha-amino acid to temperatures as high as 100–150° C., and for periods of time as long as two or three days, and longer.

Additionally, it has been observed that the prior art process is not applicable to the preparation of diketopiperazines of all alpha-amino acids. For instance, glutamic acid, which is a dibasic acid, when heated undergoes an internal condensation between the amino group and one of the acid groups, to form a cyclic compound. Moreover, for the most part, the known methods for the synthesis of diketopiperazines do not provide exceptionally high yields, and hence, are not entirely satisfactory for large scale commercial operation.

In contrast to the previously reported processes for the preparation of diketopiperazines, the process of the present invention provides a simple, efficient, one step process which utilizes readily available starting materials. Moreover, the process can be conducted at room temperature or below, and provides the desired diketopiperazine in quantitative yields in a relatively short time. Additionally, the process is particularly useful in the preparation of diketopiperazines from alpha-amino acids which normally undergo internal cyclization by a condensation reaction.

Accordingly, one or more of the following objects will be achieved by the practice of this invention. It is an object of this invention to provide a novel process for the synthesis of heterocyclic nitrogen-containing compounds. Another object of this invention is to provide a novel process for the synthesis of diketopiperazines. A further object of this invention is to provide a novel process for the preparation of diketopiperazines which is fast and can be conducted at room temperature. Another object of this invention is to provide a process for the preparation of diketopiperazines in quantitative yields. A further object of this invention is to prepare novel intermediate reaction products obtained during the synthesis of diketopiperazines. These and other objects will readily become apparent to those skilled in the art in the light of the teachings herein set forth.

In its broad aspect, the present invention is directed to a novel process for the preparation of diketopiperazines, hereinafter also referred to as alpha-amino acid anhydrides, and certain novel intermediates. The process comprises contacting an N-carboxy anhydride with at least a stoichiometric amount of an amidoxime compound in accordance with the following equation:

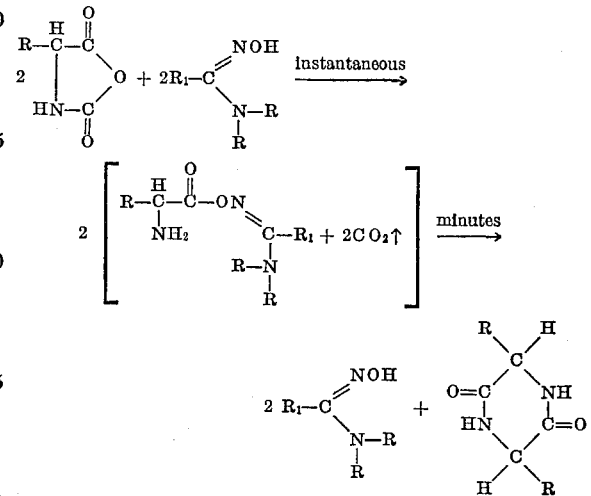

wherein R represents hydrogen, or and aliphatic, alicyclic, or heterocyclic groups of from 1 to 24 carbon atoms and $R_1$ represents hydrogen, a hydrocarbon group, or a halohydrocarbon group of from 1 to 12 carbon atoms. Preferred compositions which can be prepared by the process of this invention include those wherein R represents hydrogen or an aliphatic group of from 1 to 12 carbon atoms and $R_1$ represents a hydrocarbon group of from 1 to 6 carbon atoms. Particularly preferred are those wherein R represents alkyl, aminoalkyl, alkenyl, cycloalkyl, cycloalkenyl, aryl, aralkyl, alkoxyalkyl, aryloxyalkyl, carboalkoxy, carboaryloxy, carboarylalkoxy, and carboxyalkyl groups of from 1 to 12 carbon atoms and $R_1$ represents alkyl, haloalkyl, and aryl groups of from 1 to 6 carbon atoms.

The novel process of the present invention can be utilized in the preparation of such compounds as glycine anhydride, alanine anhydride, Serine anhydride, threonine anhydride, aspartic acid anhydride, valine anhydride, glutamic acid anhydride, histidine anhydride, hydroxyproline anhydride, leucine anhydride, isoleucine anhydride, lysine anhydride, phenylalanine anhydride, proline anhydride, thyroxine anhydride, tryptophan anhydride, tyrosine anhydride, valine anhydride, and the like.

In accordance with the instant process the reaction of the N-carboxy anhydride with the amidoxime is effected in a suitable organic solvent within a temperature range of from −25° to about 120° C., and more preferably from about 0° to about 30° C. Temperatures above and below the aforesaid ranges can also be employed but are less preferred. In most instances, the reaction can be conducted at room temperature or below.

The use of an inert solvent for the reaction is preferred though not absolutely necessary. In some instances, particularly, if the starting materials are liquids, it may be possible to promote the reaction in the absence of a solvent. However, for most practical purposes the use of a solvent is preferred. In general, the choice of the solvent will largely be dependent upon its inability to undergo reactions with either the starting materials or the diketopiperazine product; its ease of separation from the reaction product; as well as economic considerations. Due to the fact that active hydrogen atoms interfere with the reaction, the solvents which are employed should be free of groups such as —OH, —NH$_2$, and the like.

A variety of inert, organic solvents can optionally be employed in the practice of the instant process, i.e., saturated aliphatic hydrocarbons, aromatic hydrocarbons, saturated aliphatic ethers, saturated cycloaliphatic ethers, and halogen substituted saturated aliphatic hydrocarbons. Typical solvents which can be employed include benzene, toluene, xylene, dioxane, diisopropyl ether, dibutyl ether, 1,2-diethoxyethane, chloroform, tetrahydrofuran, and the like.

The amount of solvent present can vary within wide limits, and is one rather, of economic practicability. It is noted that the amount of solvent employed will also vary with the particular compounds used and the manner in which the process is conducted. Preferred solvents are those completely miscible with the reactant and product and which can be readily separated. Pressure is not necessarily critical and the process can be conducted at atmospheric, subatmospheric or superatmospheric pressures. Additionally, if desired, the process can be conducted in an inert atmosphere, such as nitrogen, argon, and the like.

The contact time necessary to effect the novel process of the present invention need only be of such duration as to insure optimum contact of the N-carboxy anhydride and amidoxime to form the corresponding diketopiperazine. Reaction times of from a few minutes to several hours are thoroughly practicable. Shorter or longer periods can also be employed depending upon the temperature (higher temperatures usually permit the use of shorter reaction times), and the manner in which the process is conducted (i.e., batchwise or continuous process).

Although the technique for effecting the reaction of the N-carboxy anhydride with the amidoxime is not necessarily critical, a significant difference in yield is obtained when the N-carboxy anhydride is added to the amidoxime. Similarly, although the mole ratio of the reactants is not critical, it is preferred to employ at least a stoichiometric amount of the amidoxime.

Recovery of the desired diketopiperazine compound can be effected by a variety of known methods. For example, the desired product can be separated by filtration and purified by recrystallization.

In contrast to the aforementioned prior art method, the instant invention provides a convenient one step process for the preparation of diketopiperazines. The reaction can be effected at room temperature, is fast, and provides high yields of the desired product which quantitatively regenerate the amidoxime starting material. Additionally, the reaction is particularly suitable for the synthesis of diketopiperidines which are not otherwise accessible by known routes.

Heretofore it has not been possible to prepare the diketopiperazine of glutamic acid by known methods of synthesis. However, by the present invention it can be obtained in relatively high yields. The following equation wherein the acid group of the N-carboxy anhydride is blocked with a benzyl group and benzamidoxime is employed as the amidoxime illustrates this novel embodiment of the invention:

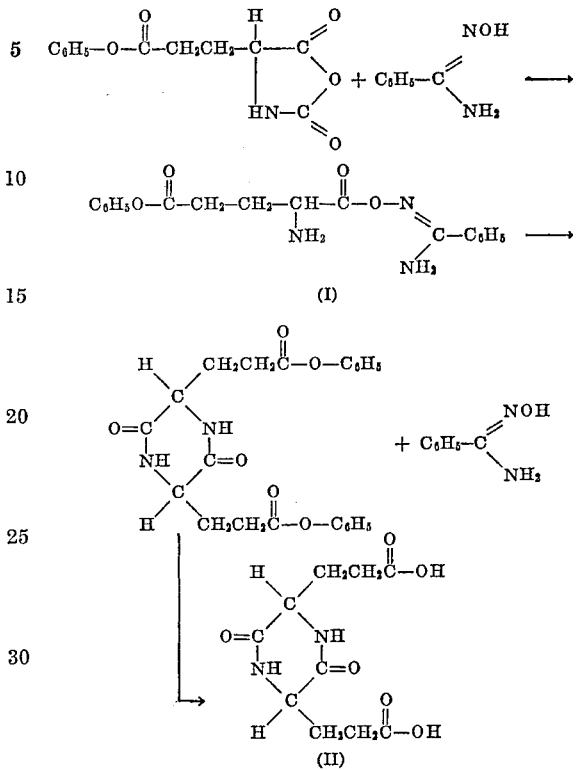

Both the intermediate O-(alpha-amino-gamma-carbobenzyloxy) butyryl benzamidoxime, (I) and the glutamic acid anhydride (II) are novel compositions of matter.

The starting materials employed in the instant invention, as hereinbefore indicated, are the N-carboxy anhydrides and amidoximes. Typical amidoximes which can be employed in this invention include, among others, formidoxime, acetamidoxime trichloroacetamidoxime, benzamidoxime, N,N-diethyl benzamidoxime, and the like.

Illustrative N-carboxy anhydrides which can be employed in the process of this invention include, among others, glycine, alanine, Serine, threonine, aspartic acid, valine, glutamic acid, histidine, hydroxyproline, leucine, isoleucine, lysine, phenylalanine, proline, thyroxine, tryptophan, tyrosine, valine, and the like.

When the R group of the N-carboxy anhydride contains no other functional groups, it can be reacted directly with the amidoxime. For example the N-carboxy anhydrides of alanine, valine, leucine, isoleucine, phenylalanine, and the like can be reacted directly with the amidoxime. However, for those anhydrides which contain a functional group in the R moiety, e.g., amino, carboxy, and the like, it is necessary to block the group by conventional methods prior to reacting with the amidoxime. For instance the N-carboxy anhydrides of lysine, glutamic acid, ornithine, aspartic acid and the like, are employed with the amino or acid groups blocked. Any suitable blocking agent can be employed to render the functional group unreactive. For example if the reactive site is an acid group it can be esterified with an alcohol such as methanol. After the diketopiperazine product is formed the blocking group can be removed by known techniques and the amino acid anhydride recovered.

The compositions which are obtained by the process of the present invention are a useful class of compounds having significant and desirable properties in various fields of application. Due to the heterocyclic structure, many of the compositions are useful as lubricant additives and as intermediates in the preparation of biologically active pharmaceutical and agricultural compounds. Moreover,

EXAMPLE 1

Preparation of lysine anhydride

To a solution of 0.35 gram of benzamidoxime in 7.5 milliliters of dry tetrahydrofuran maintained at 5° C. by cooling, is added a solution of 0.8 gram of epsilon-carbobenzoxy lysine alpha, N-carboxy-anhydride in 7.5 milliliters of dry tetrahydrofuran. Nitrogen is then bubbled through the mixture for a period of 12 hours. At the end of this period the precipitate is filtered and recrystallized from methanol. There was obtained 0.6 gram of the carbobenzoxy-blocked epsilon-carbobenzoxy lysine anhydride having a melting point of 222° C. Upon analysis, the product had the following composition: Calculated for $C_{28}H_{36}N_4O_6$: C, 64.12; H, 6.84; N, 10.70. Found: C, 63.88; H, 6.82; N, 10.63.

Upon removal of the carbobenzoxy blocking group by standard procedure, the lysine anhydride is obtained.

EXAMPLE 2

Preparation of glutamic acid anhydride

A solution containing 2.8 grams (0.02 mole) of benzamidoxime and 3.2 grams (0.012 mole) of the N-carboxy anhydride of gamma-benzyl glutamate in 50 cubic centimeters of tetrahydrofuran is allowed to stand at room temperature for 24 hours under a stream of nitrogen. The mixture containing a precipitate is then refluxed 30 minutes, diluted with ether and filtered. There was obtained 1.9 grams of gamma-benzyl glutamic acid anhydride which represented a 72 percent of the yield. Upon crystallization from ethanol, the product had a melting point of 160° C. Upon analysis, the product had the following composition: Calculated for $C_{24}H_{26}N_2O_6$: C, 65.75; H, 5.94; N, 6.40; O, 21.90. Found: C, 65.66; H, 5.86; N, 6.30; O, 22.03. Upon removal of the benzyl blocking group by standard procedure, the glutamic acid anhydride is obtained.

EXAMPLE 3

Preparation of glutamic acid anhydride

To a solution of 30 grams (0.22 mole) of benzamidoxime in 100 milliliters of tetrahydrofuran is gradually added a solution of 30 grams (0.16 mole) of the N-carboxy-anhydride of gamma-methyl glutamate dissolved in 200 milliliters of tetrahydrofuran. During the addition the temperature is maintained between 30° and 35° C. while a stream of nitrogen is bubbled through the mixture. After standing overnight, the precipitate of gamma-methyl ester of glutamatic acid anhydride is filtered and crystallized from ethanol. The yield obtained represented 90 percent of the theoretical yield. Upon analysis, the product was found to have the following composition: Calculated for $C_{12}H_{18}N_2O_6$: C, 50.34; H, 6.29; N, 9.79. Found: C, 50.61; H, 6.14; N, 9.89.

Upon removal of the methyl blocking group the glutamic acid anhydride is obtained.

EXAMPLE 4

In a manner similar to that employed in the previous example 3.95 grams (0.024 mole) of N-ethyl benzamidoxime dissolved in tetrahydrofuran was employed in place of the benzamidoxime and 4.11 grams (0.022 mole) of the N-carboxy-anhydride of gamma-methyl glutamate were used. The yield of the gamma-methyl esters of glutamic acid anhydride was 22 percent of the theoretical value.

Upon removal of the methyl blocking group the glutamic acid anhydride is obtained.

EXAMPLE 5

In a manner similar to that employed in Example 3, 2.6 grams (0.0136 mole) of N-diethyl benzamidoxime dissolved in tetrahydrofuran was employed in place of the benzamidoxime and 9.24 grams (0.0120 mole) of the N-carboxy-anhydride of gamma-methyl glutamate were used. The yield of the gamma-methyl ester of glutamic acid anhydride was 45 percent of the theoretical value.

Upon removal of the methyl blocking group, the glutamic acid anhydride is obtained.

EXAMPLE 6

In a manner similar to that employed in Example 3, 3.55 grams (0.07 mole) of trichloroacetamidoxime dissolved in tetrahydrofuran was employed in place of the benzamidoxime and 3.36 (0.018 mole) of the N-carboxy-anhydride of gamma-methyl glutamate used. The yield of the gamma-methyl ester of glutamic acid anhydride was 39 percent of the theoretical value.

Upon removal of the methyl blocking group, the glutamic acid anhydride is obtained.

EXAMPLE 7

Preparation of aspartic acid anhydride

To a solution of 2.8 grams (0.02 mole) of benzamidoxime in tetrahydrofuran is gradually added a solution of 3 grams of N-carboxy-anhydride of beta-benzyl aspartate in tetrahydrofuran. After recovering the product in the same manner as employed in the previous examples, there was obtained 1.8 grams of the beta-benzyl ester of aspartic acid anhydride which represented 73 percent of the theoretical value. Upon analysis the product was found to have the following composition: Calculated for $C_{22}H_{22}N_2O_6$: C, 64.40; H, 5.37; O, 23.41. Found: C, 64.63; H, 5.27; O, 23.42.

Upon removal of the benzyl blocking groups, the aspartic acid anhydride is obtained.

EXAMPLE 8

Preparation of glycine anhydride

A mixture of 8.16 grams (0.06 mole) of benzamidoxime and 3.9 grams (0.03 mole) of glycyl chloride hydrochloride in 150 milliliters of chloroform is allowed to stand at room temperature for approximately 24 hours. The precipitate is filtered and dissolved in 50 milliliters of triethylamine are added and the precipitate formed is filtered and crystallized from water. There was obtained 0.8 gram of glycine anhydride which represented 50 percent of the theoretical yield. The product had a melting point of 250° C. Upon analysis the product had the following composition: Calculated for $C_6H_6O_2N_2$: C, 42.12; H, 5.26; N, 24.57. Found: C, 42.21; H, 5.63; N, 24.59.

EXAMPLE 9

Preparation of glutamic acid anhydride and intermediate products

A mixture of 1.87 grams (0.01 mole) of benzamidoxime and 1.9 grams of the N-carboxy-anhydride of gamma-methyl glutamate in 50 milliliters of chloroform was allowed to stand at room temperature overnight while nitrogen gas was bubbled through. There was obtained 3.2 grams of O - (gamma-carbomethoxy-alpha-amino) butyryl benzamidoxime hydrochloride. After recrystallizing from a tetrahydrofuran-ether mixture, the product had a melting point of 98° C. Upon analysis the product was found to have the following composition: Calculated for $C_{13}H_{17}N_3O_4 \cdot HCl$: C, 49.61; H, 5.71; N, 13.31. Found: C, 48.23; H, 6.46; N, 13.48.

Thereafter the product was dissolved in tetrahydrofuran and a 25 percent molar excess of triethylamine added to precipitate the anhydride derivative. This product is filtered, recrystallized and methyl blocking group removed by standard procedure to provide the glutamic acid anhydride.

EXAMPLE 10

Preparation of glutamic acid anhydride and intermediate products

A mixture of 1.9 grams (0.01 mole) of benzamidoxime and 2.63 grams of the N-carboxy-anhydride of gamma-benzyl glutamate in 50 milliliters of chloroform was allowed to stand at room temperature overnight while nitrogen gas was bubbled through. There was obtained 3.3 grams of O-(alpha-amino-gamma-carbobenzyloxy) butyryl benzamidoxime hydrochloride. This represented a 100 percent yield. After crystallizing from a tetrahydrofuran-ether mixture, the product had a melting point of approximately 100° C. Upon analysis the product was found to have the following composition: Calculated for $C_{19}H_{21}N_3O_4$: C, 58.23; H, 5.62; N, 10.72. Found: C, 58.18; H, 6.11; N, 10.11.

Thereafter the product was dissolved in tetrahydrofuran and a 25 percent molar excess of triethylamine added to precipitate the anhydride derivative. This product is filtered, recrystallized and the benzyl blocking group removed by standard procedure to provide the glutamic acid anhydride.

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A process for the preparation of diketopiperazines of the formula:

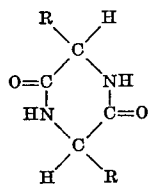

which comprises contacting an N-carboxy-anhydride of the formula:

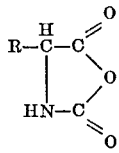

with at least a stoichiometric amount of an amidoxime of the formula:

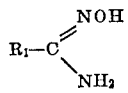

wherein R represents a member selected from the group consisting of hydrogen and alkyl, aminoalkyl, monocarbocyclic aryl, carboxyalkyl groups of from 1 to 24 carbon atoms, with the proviso that any group contained in said R of said N-carboxy-anhydride which is reactive with said amidoxime be rendered inactive by blocking prior to said contacting; $R_1$ represents a member selected from the group consisting of hydrogen, hydrocarbon, and halohydrocarbon groups of from 1 to 12 carbon atoms; and thereafter recovering said diketopiperazine.

2. A process for the preparation of diketopiperazines of the formula:

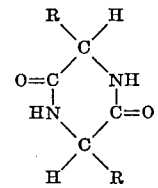

which comprises the addition of an N-carboxy-anhydride of the formula:

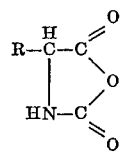

to an inert solvent containing at least a stoichiometric amount of an amidoxime of the formula:

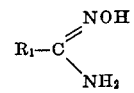

wherein R represents a member selected from the group consisting of hydrogen and alkyl, aminoalkyl, monocarbocyclic aryl, carboxyalkyl groups of from 1 to 24 carbon atoms, with the proviso that any group contained in said R of said N-carboxy-anhydride which is reactive with said amidoxime be rendered inactive by blocking prior to said contacting; $R_1$ represents a member selected from the group consisting of hydrogen, hydrocarbon and halohydrocarbon groups of from 1 to 12 carbon atoms; and thereafter recovering said diketopiperazine.

3. A process for the preparation of 2,5-diketopiperazine which comprises the addition of glycine N-carboxy anhydride to an inert solvent containing at least a stoichiometric amount of an amidoxime of the formula:

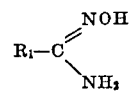

wherein $R_1$ represents a member selected from the group consisting of hydrogen, hydrocarbon and halohydrocarbon groups of from 1 to 12 carbon atoms; and thereafter recovering said 2,5-diketopiperazine.

4. The process of claim 3 wherein said amidoxime is acetamidoxime.

5. The process of claim 3 wherein said amidoxime is benzamidoxime.

6. A process for the preparation of 3,6-dimethyl-2,5-diketopiperazine which comprises the addition of alanine N-carboxy anhydride to an inert solvent containing at least a stoichiometric amount of an amidoxime of the formula:

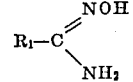

wherein $R_1$ represents a member selected from the group consisting of hydrogen, hydrocarbon and halohydrocarbon groups of from 1 to 12 carbon atoms; and thereafter recovering said 3,6-dimethyl-2,5-diketopiperazine.

7. The process of claim 6 wherein said amidoxime is acetamidoxime.

8. The process of claim 6 wherein said amidoxime is benzamidoxime.

9. A process for the preparation of 3,6-di(carboxymethyl)-2,5-diketopiperazine which comprises the addition of the N-carboxy anhydride of beta-hydrocarbyl aspartate to an inert solvent containing at least a stoichiometric amount of an amidoxime of the formula:

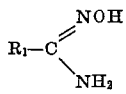

wherein $R_1$ represents a member selected from the group consisting of hydrogen, hydrocarbon and halohydrocarbon groups of from 1 to 12 carbon atoms; and thereafter recovering said 3,6-di(carboxymethyl)-2,5-diketopiperazine.

10. The process of claim 9 wherein said amidoxime is acetamidoxime.

11. The process of claim 9 wherein said amidoxime is benzamidoxime.

12. A process for the preparation of the diketopiperazine 3,6-di(aminobutyl)-2,5-diketopiperazine which comprises the addition of epsilon-carbobenzoxy lysine alpha, N-carboxy anhydride to an inert solvent containing at least a stoichiometric amount of an amidoxime of the formula:

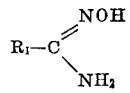

wherein $R_1$ represents a member selected from the group consisting of hydrogen, hydrocarbon and halohydrocarbon groups of from 1 to 12 carbon atoms; and thereafter recovering said 3,6-di(aminobutyl)-2,5-diketopiperazine.

13. The process of claim 12 wherein said amidoxime is acetamidoxime.

14. The process of claim 12 wherein said amidoxime is benzamidoxime.

No references cited.

HENRY R. JILES, *Primary Examiner.*